United States Patent [19]

Allen

[11] Patent Number: 4,848,015
[45] Date of Patent: Jul. 18, 1989

[54] PICTURE FRAME AND METHOD OF MANUFACTURE

[76] Inventor: Cecil G. Allen, 1122 E. Jefferson, Harlingen, Tex. 78550

[21] Appl. No.: 111,290

[22] Filed: Oct. 22, 1987

[51] Int. Cl.⁴ .......................... A47G 1/06; G09F 1/12
[52] U.S. Cl. ......................................... 40/154; 40/156
[58] Field of Search ................. 40/154, 156, 153, 152

[56] References Cited

U.S. PATENT DOCUMENTS

| | | | |
|---|---|---|---|
| 284,316 | 9/1883 | Moore | 40/154 |
| 479,004 | 7/1892 | Jacobsen | 40/154 |
| 1,904,318 | 4/1933 | Lehere | 40/154 |
| 2,296,596 | 9/1942 | Brown | 40/154 |
| 2,312,007 | 2/1943 | Thrasher | 40/154 |
| 2,373,074 | 4/1945 | Ziemmerman | 40/154 |
| 3,053,001 | 9/1962 | Allen | 40/154 |
| 3,479,761 | 11/1969 | D'Amato | 40/156 |

FOREIGN PATENT DOCUMENTS 19195 of 1910 United Kingdom .................. 40/154

Primary Examiner—Gene Mancene
Assistant Examiner—J. Hakomaki
Attorney, Agent, or Firm—Cushman, Darby & Cushman

[57] ABSTRACT

A frame for mounting and displaying pictures and the like which is a molded one-piece unit and includes a backing member which is preferably adhered to the frame during molding. The backing member includes retainers circumferentially disposed about the display opening defined by the frame to overlie the marginal edge portions of a picture mounted in the frame and a drawstring engaged with the retainers to tighten them over those edge portions and retain the picture securely in position within the frame irrespective of the thickness of the picture.

16 Claims, 2 Drawing Sheets

PICTURE FRAME AND METHOD OF MANUFACTURE

BACKGROUND OF THE INVENTION

The present invention relates to picture frames and, more particularly, to a picture frame assembly which is an improvement over my earlier U.S. Pat. Nos. 3,552,052 and 3,053,001, the disclosures of which are hereby incorporated by reference herein. Specifically, the picture frame assembly of the present invention, in accordance with a first aspect thereof, comprises the unique combination of an integrally molded frame member and means secured to the rear face of the frame member, and preferably molded thereto, for retaining pictures and the like of various thicknesses within the frame. In accordance with a second aspect of the present invention, the frame member is molded with a mold including at least a pair of concentric mold members, such that the innermost mold member can be removed and replaced so as to enable the quick and easy formation of a plurality of frame configurations.

SUMMARY OF THE INVENTION

It is the primary object of the present invention to provide an improved frame which is durable, non-warping and pleasing in appearance while at the same time is extremely economical to manufacture and adapted to fabrication by mass production techniques.

It is another object of the present invention to provide a frame having a retaining means which can securely mount a picture or the like within the frame irrespective of the thickness of the picture being secured to the frame.

It is a further object of this invention to provide a means whereby the force with which a picture is retained within the frame can be varied and accordingly a picture can be retained within the frame securely despite variations in size or material.

It is yet another object of the invention to provide a frame of unitary construction, with no joint lines marring the forward face thereof.

It is yet another object of the present invention to provide a method of manufacturing a molded frame whereby the aforementioned objects can be realized in an economical fashion.

It is another object of this invention to provide a mold for molding a frame which includes at least first and second concentric mold elements, such that one or both mold elements can be changed to provide a variety of designs for the frame molded therewith.

The foregoing objects are realized in accordance with the present invention by molding a frame as a unitary structure and having a peripheral back cover mounted and preferably molded thereto. The back cover includes a plurality of spaced flaps about the inner periphery thereof adapted to overlie the marginal edge portions of a picture, each of the flaps including means for slidably coupling the same to a circumferential tightening device so that the flaps can be tightened to secure and retain a picture, for example, within the frame irrespective of the thickness of the picture.

Furthermore, the frame of the present invention is preferably formed in a mold including at least first and second concentric mold members. Thus, frames of various configurations and thicknesses can be easily and quickly made by simply changing one or more mold members.

Other objects, features and characteristics of the present invention, as well as the methods of operation and functions of the related elements of the structure, and the combination of parts and economies of manufacture, will become more apparent upon consideration of the following detailed description and the appended claims with reference to the accompanying drawings all of which form a part of this specification, wherein like reference numerals designate corresponding parts in the various figures.

DETAILED DESCRIPTION OF THE PRESENTLY PREFERRED EXEMPLARY EMBODIMENTS

Figure 1:
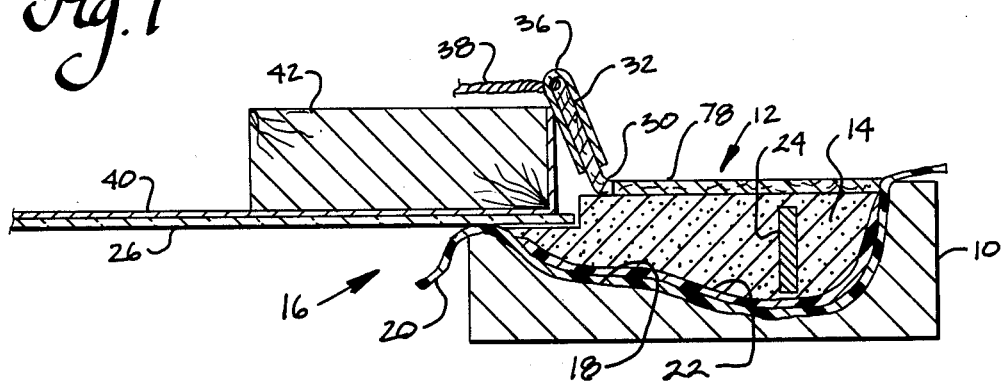
FIG. 1 is an enlarged fragmentary crosssectional view, partly broken away for clarity, showing a frame formed in accordance with the present invention and illustrating a mold which may be used in its manufacture.

Referring to FIG. 1, there is shown a crosssection of a mold 10 holding a picture frame 12 with a foamed plastic base member 14 formed in accordance with the present invention. The mold 10 may be rectangular, circular, oval or any other suitable configuration to mold a frame base member 14 of like configuration having a central opening 16 for displaying a framed picture or the like. As can be seen, in this embodiment is is contemplated that the frame member 14 is formed inside a hollow mold cavity 18 which may have a design or a pattern carved on the interior surface thereof (not shown), so as to provide a decorative design on the front face of the finished frame 12. The frame member 14 can be molded without the provision of a front face cover, by providing a thin plastic liner 20 in the mold cavity 10' so that the foamed plastic material does not adhere to the mold surface following the molding process. When a plastic liner is used, it can be any appropriate thin plastic having a thickness of about 0.7 mm.

In the alternative, a front face cover 22 of a flexible material, such as foil, thin cardboard, thin metal or plastic may be inserted into the mold cavity 10' prior to the addition of foamable plastic material. Cover 22 then acts as mold liner and adheres to the plastic material of the frame to provide the finished front face thereof.

Figure 2:
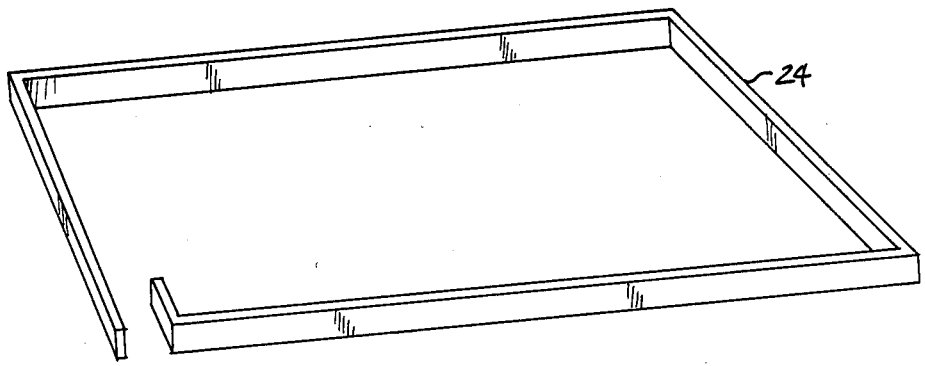
FIG. 2 is a perspective view of a metal insert which is preferably incorporated in the frame of the present invention to enhance the strength and rigidity thereof.

After the thin plastic liner 20 and/or outer face cover 22 have been placed in the mold cavity 18, a metal reinforcing strip 24 (best shown in FIG. 2) is placed into the mold cavity about the circumferential extent thereof. The metal strip 24 has a configuration corresponding to that of the mold and thus depending upon the shape of the frame being molded is round, square, rectangular, etc. One or more apertures (not shown) may be provided in the metal strip 24 so as to ensure the complete filling of the mold cavity 18 with plastic material, so will be discussed more fully below.

Figure 3:
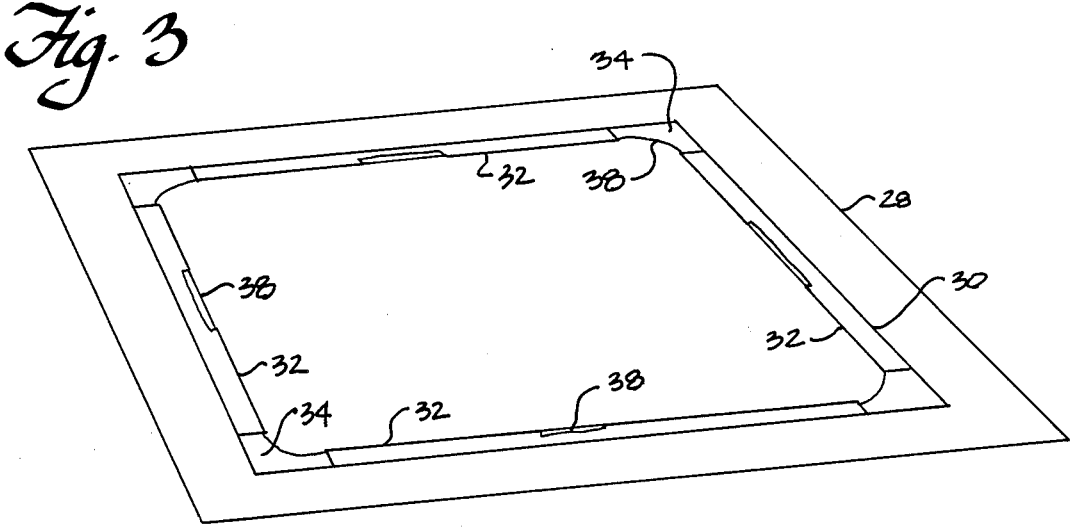
FIG. 3 is a perspective view of the frame backing or back cover with picture retaining means formed in accordance with the present invention.

A transparent sheet of glass or clear plastic 26 is then mounted to the frame mold 10 so as to extend across and cover the display opening 16 defined by the mold and overlie the inner marginal edge portions of the mold cavity 18 to provide a front protective cover for pictures or the like mounted in the finished frame. Finally, a flat backing member or cover 28, shown best in FIG. 3, is mounted in cooperation with the transparent sheet 26, so as to cover and close the mold cavity 18.

A foamable plastic which is adapted to expand on curing is injected or poured into the mold either before the backing member 28 is put is place or afterward through a suitable aperture (not shown) in the mold 10, as discussed more fully below with reference to FIG. 4. Once the mold cavity 18 has been sealed with the backing member 28, suitable weights (not shown) are preferably applied to it and to the sheet 26 so as to allow the pressure from the expansion of the foamable plastic to press the plastic lining 20 or face cover 22, if any, into the design configuration surface of the mold cavity 18. The weights also facilitate adherence of the member 28 and sheet 26 to the plastic frame base member 14. The foamable plastic may have varying color additives mixed therein, particularly where no front face cover 22 is provided. After about 15 minutes, the cured and hardened frame member 14 is removed form the mold 10, together with the adhering sheet 26 and a backing member 28, and the thin plastic liner 20, if used, is peeled away.

As is apparent, multiple layer molds may be stacked so that a number of frames can be manufactured in a single operation. Furthermore, any fluid material which flows and will harden may be used to make the frame base member 14 if the face 22 cover is first pressed into the mold design. The frame 12 may then be electroplated metalized or painted if desired.

The backing member 28 formed in accordance with the present invention, shown in particular in FIGS. 1, 3 and 4 and discussed more fully below, preferably is of heavy cardboard, is formed or scored, as at 30, so as to include at least one upwardly bendable flap 32 on each of the four interior edges of the frame 12 which overlie the marginal edge portion of the sheet 26. The flaps 32 are cut out at the interior corners of the frame as at 34, to eliminate interference between adjacent flaps and for other reasons later apparent. As will become apparent, where a round frame is formed, the flaps 32 should be disposed at spaced locations about the interior edge thereof. Each flap 32 has one or more loops 36, preferably of cloth or the like secured to its free inner edge for receiving a drawstring 38, for example, to pull the flaps down over the marginal edge portions of a picture which has been placed in the frame 12. Accordingly, as, for example, is shown in FIG. 1, a picture on a canvas 40 mounted on a stretcher frame 42 can be mounted atop and behind the clear glass or plastic sheet 26 secured to the frame 12. On end of the drawstring 38 is anchored and the free end can then be pulled taut to secure the picture in place by pulling the flaps 32 tight against and over the stretcher frame 42, as shown. Thus, the frame 12 can accommodate a picture of any particular thickness. The free end of the drawstring 38 can be secured in its taut condition by winding or the like around a clip (not shown) which in turn locks the picture in place.

Preferably the flaps 32 and loops 36 have notches in their free edges midway of their lengths to expose the drawstring 38 to provide a convenient way to hang the frame 12 vertically or horizontally on a supporting wall hook or the like (not shown).

Figure 4:
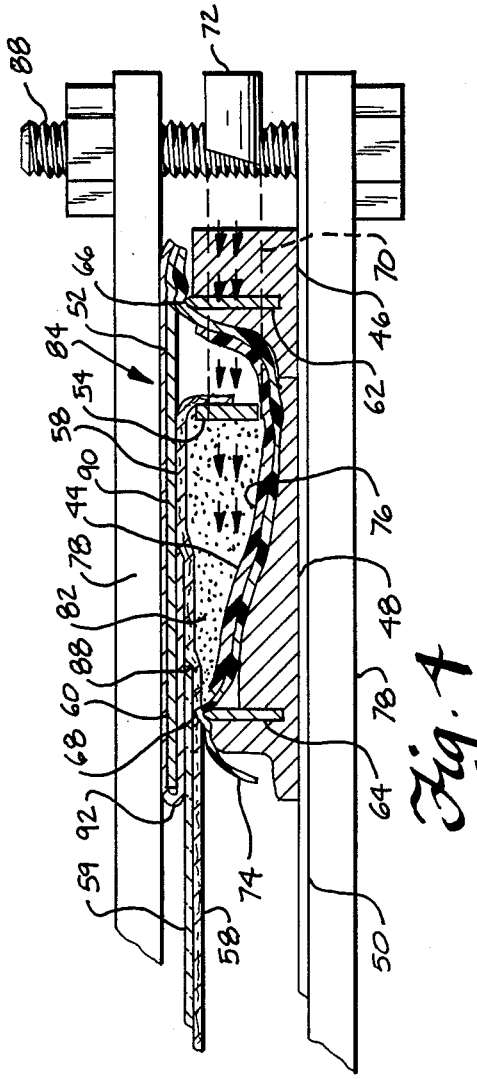
FIG. 4 is a fragmentary cross-sectional view corresponding to FIG. 1 showing an alternative mold for forming the frame of the present invention.

Referring now to FIG. 4, an alternate method and apparatus for forming the frame base member 14 of the present invention is shown. As can be seen, in this embodiment the mold cavity 44 is defined by concentric outer and inner mold members 46, 48.

Figure 6:
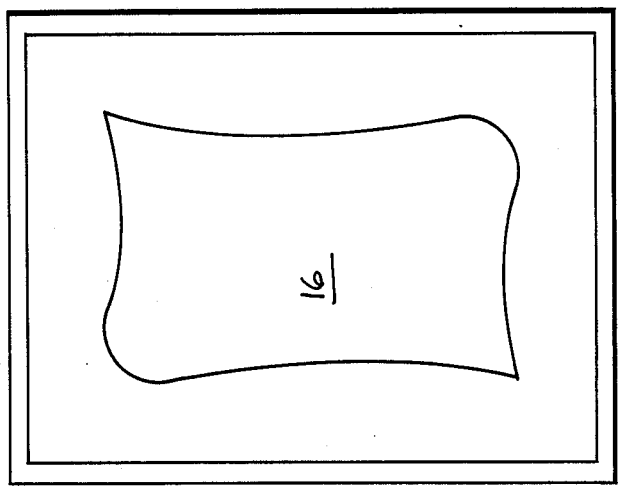
FIG. 6 is a top view of the front of a frame made in accordance with the present invention.
Figure 5:
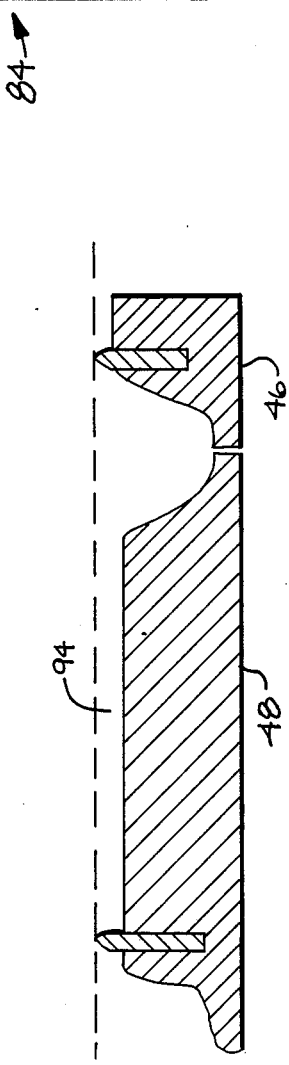
FIG. 5 is a fragmentary cross-sectional view, corresponding to FIG. 4 showing an alternative mold configuration for fabricating the frame of this invention.

The inner mold member 48 is attached to the flat base 50 of the molding apparatus and the outer 46 mold member is removable. The outer mold member 46 can be easy removed by prying it from the base 50 with a screwdriver or the like (not shown). This facilities removal of the outer mold member 46 and prevents marring of frame member 14. Likewise, the outer mold member 46 can be removed and replaced by a different outer mold member, so as, for example, to either alter the shape and design of the frame member 14 molded in the molding apparatus, as shown, for example, in FIG. 6, or to provide a built-in mat board for the frame assembly, as shown in FIG. 5.

In this embodiment, the backing member 52 extends beyond the outer edge of the mold cavity 44. The metal reinforcing strip 54 is secured to the downturned edge portions 56 of an arbor sheet 58, of cardboard or the like, which extends across the display opening beneath the sheet 59 and the upper marginal edge portions of the arbor sheet, inwardly of the downturned edge portions, are adhesively secured to the undersurface of the backing member 52 outwardly of the flaps 60.

The arbor sheet 58 not only serves to support the metal rectangular strip 54 or other shaped reinforcing member but also to prevent the foamable plastic or other material from escaping at the inside edge of the mold.

Each of the mold members 46, 48 has a replaceable steel cutting blade 62, 64 embedded therein with a cutting edge 76, 78 projecting upwardly therefrom at the corresponding edge of the mold cavity 44. The cutting blades 62, 64 may have spacers (not shown) placed thereunder to raise or lower the projecting cutting edge 66, 68, as required, dependent upon the thickness of the frame desired as well as the remaining components of the assembly. The cutting blades 62, 64 may further include notches sawed in the top edges all around the same, about every two inches or so, for the release of gas and air while the foamable plastic is curing.

As mentioned above, the embodiment of FIG. 4 illustrates that the foam plastic can be injected or poured through holes 70 in the mold that are closed by plugs 72 after injection, the liner 74 or face cover 76 is pierced at the holes to admit the injected material and the reinforcing strips 54 likewise pierced at spaced intervals to permit the material to flow therethrough. Thus, in the embodiment illustrated in FIG. 4, assembly of the entire frame is completed prior to the injection of any plastic material. Heavy steel compression plates 78 are mounted on the mold, one on top and one on the bottom and drawn together by large bolts 80. As described above, a plurality of such molds may be stacked between the plates 78. The bolts 80 are tightened by a torque wrench (not shown), for example, so that cutting blades 62, 64 cut partially into the cardboard of the backing member 52 and the arbor sheet 50. Foamable plastic or the like is then injected or poured through the apertures 70 in the outer mold member 46 which are then closed with plugs 72. After the foamable plastic has ceased expansion and hardened, the bolts 80 may be further tightened so that cutting blades 62 and 64 cut respectively through the backing member 52 and the arbor sheet 58 to remove surplus material. As is apparent, the inner cutting blade 64 severs the arbor sheet 58 about the inner periphery of the frame base member 82 so as to expose the transparent glass or plastic sheet 59 which, in use, covers the picture or the like mounted to the frame. The other blade 62 severs the portion of the backing member 52 extending beyond the outer edge of the frame member 82.

After the completed picture frame 84 is removed from the mold, the plastic liner 74, if used, is stripped away and the frame is ready to be painted or otherwise handled.

Referring to FIG. 4, the backing member 52 of the frame is preferably formed from a heavy cardboard material that is first cut to size so as to be at least half an inch overall larger than the outside edge of the mold cavity 44. This surplus is cut away by the cutting blade 62 of the mold. However, providing such a surplus minimizes the likelihood that the foamable plastic material will overflow the mold.

The inside edge of backing member 52, on the other hand, preferably has an opening about one inch smaller all around than the size of the standard picture to be placed in the frame 84. Thus, the inner marginal edge portions of the backing member 52 will overlie a picture mounted into the frame 84. The flaps 60 of the backing are formed by perforating or scoring along a desired fold line, as at 88, to allow easy bending upwardly and outwardly of the back flaps. The notches in the flaps 60 to expose the drawstring and the cutouts at the inner corners of the backing member 52 are die cut at that same time.

In the alternative, the backing member 52 may be laminated with a cloth sheet 90 to enhance the durability and aesthetic appearance of the back of the frame 84 and to form loops 92 for the drawstring. More particularly, the inside portion of the cloth sheet 90 is cut out leaving one and a half inches of the cloth to be turned under to form the loops 92 and making double reinforcement for the flap 60. An even further alternative, as shown in FIG. 1 is simply forming loops 36 (FIG. 1) for the drawstring 38 without laminating cloth to the entire backing member 28. The drawstring 38 and lock clip (not shown) are preferably put on after the frame base member is removed from the mold.

As is apparent from the foregoing, the curvature of the mold cavity may vary to produce thick or thin styles of picture frame molding. Further, as was stated above, the mold may produce a built-in mat board for the picture to be mounted on the frames as shown in FIG. 5. The mold there shown is of the type shown in FIG. 4 and the mold cavity may be shaped so as to provide a thin portion 84 that simulates a mat board. It is further contemplated that the inner member 58 of the two-part mold may have the cutting blade removed and replaced by cutting blades formed in varying designs as shown, for example, in FIG. 6.

While the invention has been described in connection with what is presently considered to be the most practical and preferred embodiment, it is to be understood that the invention is not limited to the disclosed embodiment, but, on the contrary, it is intended to cover various modifications and equivalent arrangements included within the spirit and scope of the appended claims.

What is claimed is:

1. A frame for mounting and displaying pictures comprising:
    an endless frame member comprising a molded unitary structure having a front face and a rear face and defining an opening for displaying a picture mounted thereto and overlying the inner marginal edge portions of said rear face;
    an endless backing member fixedly adhered to said rear face outwardly of said rear face edge portions at the time when said frame member was molded and including a plurality of flexible retaining flaps at spaced locations about the inner periphery of said backing member and overlying said rear face edge portions to overlie the marginal edge portions of and replaceably retain a picture mounted to said frame member, said flaps having loops extending along the edges thereof; and
    means for circumferentially tightening said flaps into engagement with the marginal edge portions of pictures of various thicknesses mounted to said frame comprising a draw string extending through said loops.

2. A frame as in claim 1, wherein the loops are of cloth.

3. A frame as in claim 1 wherein the flaps are notched uniformly to provide access to the drawstring for hanging said frame.

4. A frame as in claim 1, including a reinforcing strip within the material of the frame member to enhance the structural integrity thereof.

5. A frame for mounting and displaying pictures comprising:
    an endless frame member comprising a molded unitary structure having a front face and a rear face and defining an opening for displaying a picture mounted thereto and overlying the inner marginal edge portions of said rear face;
    an endless backing member mounted to said rear face outwardly of said rear face edge portions including a plurality of flexible retaining flaps at spaced locations about the inner periphery of said backing member and overlying said rear face edge portions to overlie the marginal edge portions of and replaceably retain a picture mounted to said frame member, said flaps having loops extending along the edges thereof;
    a transparent sheet adhered to said frame member at the time when said frame member was molded to cover said display opening; and
    means for circumferentially tightening said flaps into engagement with the marginal edge portions of pictures of various thicknesses mounted to said frame comprising a draw string extending through said loops.

6. A method of forming a frame for mounting and displaying pictures, the steps comprising:
    providing a mold having an endless open top molding cavity for forming a three-dimensional frame member of desired shape, size and ornamentation with a central display opening;
    inserting at least one of a thin plastic liner and a thin frame cover member into the molding cavity to cover the bottom thereof;

placing a transparent sheet to overlie the portions of the mold adjacent the inner edge of the cavity so as to extend across the display opening;

filling the mold cavity with a pourable hardenable material to form the frame member;

placing an endless backing member on the mold so as to cover the molding cavity and to seal and to adhere to the material therein, the backing member including a plurality of picture-retaining means at spaced locations about the inner periphery thereof so as to each overlie a portion of the inner peripheral portion of the cavity; and allowing the material in the mold to harden to form a frame member having the backing member and transparent sheet adhered thereto and a configuration defined by the molding cavity.

7. The method of claim 6 including:

removing the molded frame member from the molding cavity;

mounting to the frame member a picture to be displayed in facing relation to the transparent sheet;

operatively coupling to the retaining means a means for circumferentially tightening said retaining means into overlying engagement with peripheral rear marginal edge portions of the picture; and tightening the tightening means so as to securely mount the picture within the picture frame.

8. A method as in claim 6, further comprising the step, prior to the filling step, of inserting a strip of reinforcing material into the molding cavity so as to extend at least along a portion of the periphery thereof to thereby reinforce the frame member molded therein.

9. A method as in claim 6, wherein the step of filling said mold cavity comprises filling said mold cavity with a curable foamable plastic material which expands on curing.

10. A method as in claim 6, wherein the step of providing a mold comprises providing a mold having concentric inner and outer parts each defining a circumferential portion of a frame to be molded and at least one of the parts being removable and replaceable by another so as to alter the configuration of the frame member molded in the mold.

11. A method as in claim 8, wherein the step of inserting the reinforcing strip comprises inserting a reinforcing strip coupled to an arbor sheet such that the arbor sheet extends across the display opening.

12. A method as in claim 11 wherein the mold has a projecting cutting edge extending along the inner peripheral edge of the cavity to cut out the central portion of the arbor sheet covering the opening on exertion of pressure on that portion of the sheet overlying the cutting edge.

13. A method as in claim 6, wherein the backing member is sized so as to extend beyond the outer periphery of the molding cavity.

14. A method as in claim 13 wherein the mold has a projecting cutting edge extending along the outer peripheral edge of the cavity to cut off the portion of the backing member extending beyond the outer periphery of the cavity.

15. A method as in either of claims 12 or 14 including:

following the step of placing the backing member, clamping the mold and backing members between two clamping plates; and following the hardening step increasing the clamping pressure exerted by the plates to respectively cut out and cut off the central portion of the arbor sheet and the extending portion of the backing member.

16. The method defined in claim 15, including:

stacking a plurality of molds following the hardening step; and clamping the stacked molds between the clamping plates.

* * * * *